Patented May 31, 1938

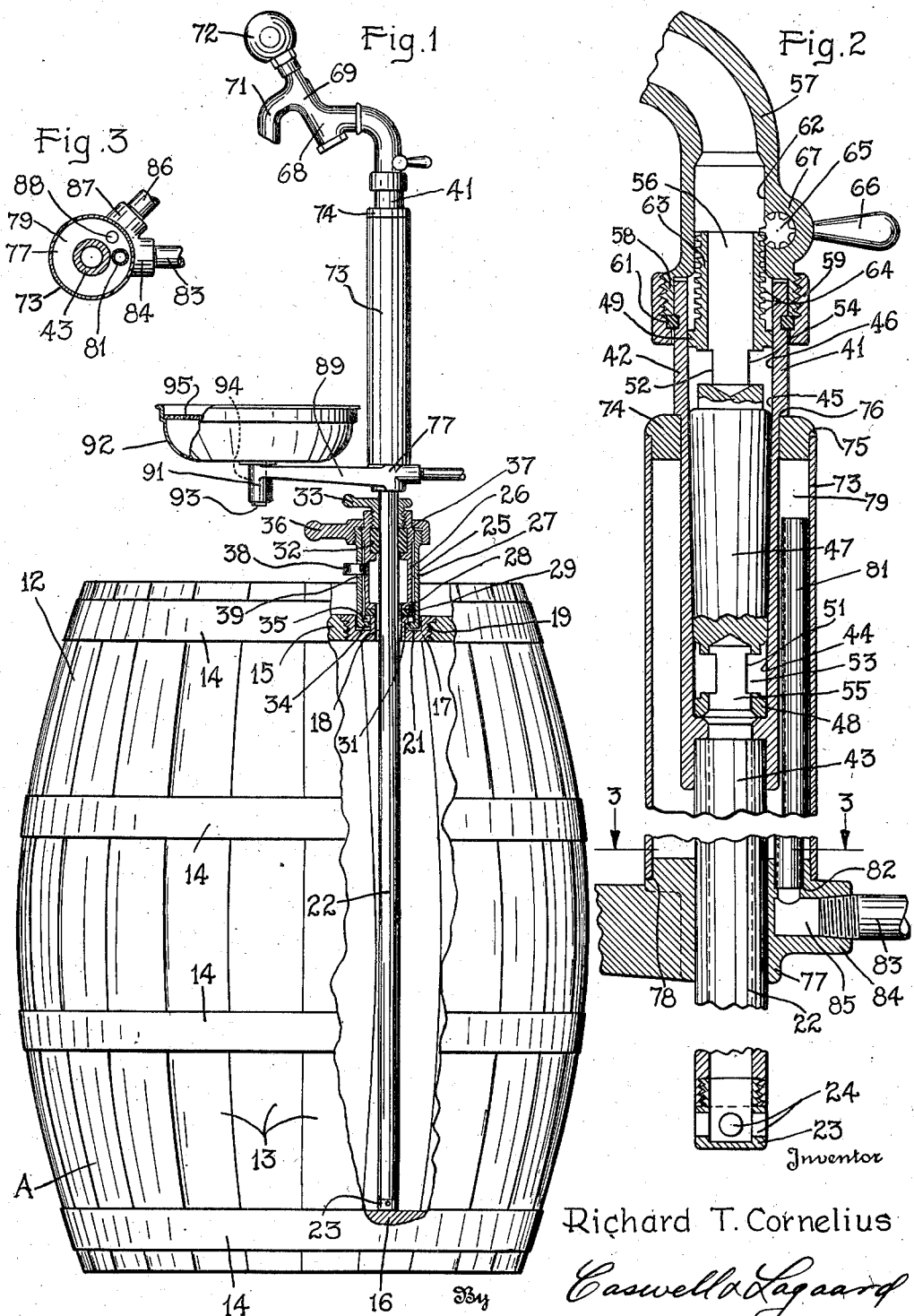

2,119,383

UNITED STATES PATENT OFFICE 2,119,383

BEER COOLING AND DISPENSING DEVICE

Richard T. Cornelius, Minneapolis, Minn.

Application August 17, 1936, Serial No. 96,387

6 Claims. (Cl. 225—40)

My invention relates to beer cooling and dispensing devices and has for an object to provide a device which may be directly attached to and supported on a beer barrel and by means of which cold beer may be directly dispensed from the barrel.

An object of the invention resides in providing a cooling system for the device whereby cold beer may be drawn from the barrel without the use of the usual cooling coil.

Another object of the invention resides in providing a device in which cooling of the beer takes place from the time it leaves the barrel to the time it is dispensed from the faucet.

Another object of the invention resides in providing a device utilizing a tap tube and in providing cooling means for cooling the exposed portion of the tap tube.

Another object of the invention resides in providing a device employing a flow regulating device and in providing cooling means for cooling the flow regulating device.

A still further object of the invention resides in arranging the flow regulating device at the uppermost end of the tap tube and in alignment therewith and in encircling portions of the tap tube and flow regulating device with a jacket forming a cooling chamber about the same.

Another object of the invention resides in providing a collar encircling the tap tube and secured to the lowermost end of said jacket and closing the lowermost end of said cooling chamber.

A still further object of the invention resides in providing means for directing a cooling medium into and out of said cooling chamber and in supporting said means on said collar.

A feature of the invention resides in attaching a bracket to the collar for the purpose of supporting a tray on which glasses are held during the dispensing of the beer.

Other objects of the invention reside in the novel combination and arrangement of parts and in the details of construction all hereinafter illustrated and/or described.

In the drawing:

Fig. 1 is an elevational part sectional view of a beer barrel illustrating an embodiment of my invention applied thereto.

Fig. 2 is an elevational longitudinal sectional view of a portion of the structure shown in Fig. 1, and drawn to a somewhat larger scale.

Fig. 3 is a plan sectional view taken on line 3—3 of Fig. 2 and drawn to a smaller scale.

The dispensing of beer directly from the barrels and without running the beer through cooling coils and other systems involving considerable lengths of pipes or conduits, has found considerable favor with consumers. In attempting to dispense beer directly from the barrel considerable difficulty has been encountered in maintaining the beer cold particularly when the drawing of beer from a barrel is periodical. The present invention overcomes this difficulty by providing a construction in which the tap tube itself and parts of the dispensing mechanism are directly cooled so as to prevent heating of the beer after it leaves the barrel.

For the purpose of illustrating the application of the invention, an ordinary beer barrel has been shown which is indicated in its entirety by the reference numeral A. The construction of such beer barrels forming no particular feature of the invention has not been illustrated in detail in the drawing. The beer barrel shown comprises a body 12 constructed with staves 13 held together in the usual manner with metal hoops 14. The upper end of the barrel is provided with a head 15 and the lower end of the barrel with a bottom 16 which are held in place by the staves 13 in the customary manner. Access to the barrel is had through a bung 17 which is constructed with the usual bung hole 18. This bung has threads 19 which screw into the head 15 and hold the bung securely attached to the same. In the bung 17 is formed a socket 21 which receives a suitable fixture 25 for attaching a tap tube to the barrel.

The invention utilizes a tap tube 22 which is of such dimensions as to be freely received in the bung hole 18 of bung 17 and to be extended to the bottom 16 of barrel A. This tube is of such a length that the same projects considerably above the head 15 of the barrel for a purpose to be presently described in detail. The tap tube 22 is provided at its lower end with a plug 23 which is screwed into said tube and which is drilled transversely as designated at 24 to permit of the entry of beer into said tube in close proximity to the bottom of the barrel.

The fixture 25 for attaching the tap tube 22 to the barrel A, comprises an inner tubular member 26 and an outer tubular member 27. The inner tubular member 26 is constructed at its lower end with an inwardly extending flange 28. A gasket 29 is disposed between this flange and a collar 31 formed on the bung 17 and forms a fluid tight connection therebetween. The upper end of this tubular member is recessed to receive a gasket 32 which is urged into engagement with the walls of said member and the tap tube 22 by means of a nut 33 to form a fluid tight connection between the same. The tubular member 27 is provided with inwardly extending lugs 34 which engage complemental lugs 35 on the collar 31. By rotating the tubular member 25 these lugs are brought into engagement and the member 27 held attached to the bung 17. A nut 36 screwed upon the exterior of the tubular member 27 and engaging a shoulder 37 on the tubular member 26 draws said member 26 downwardly, causing the flange 28 to seat upon the gasket 29 and correspondingly draws the tubular member 27 upwardly causing a firm engagement of the lugs 34 and 35. A nipple 38 passes freely through an opening 39 in the member 27 and is threaded into the member 26. This nipple may be connected to a source of air under pressure or to an air pump whereby air under pressure may be directed into the uppermost portion of the barrel to cause the discharge of beer from the same.

At the upper end of the tap tube 22 is mounted a flow regulating device 41. This device is similar to that shown in my copending application for patent, Serial Number 70,364 filed March 23, 1936 and includes a cylindrical barrel 42 which is soldered at its lower end to the upper end 43 of the tap tube 22. Adjacent the lower end of the barrel 42 the same is constructed with a cylindrical bore 44. Intermediate the ends of the barrel the same is constructed with a tapered or conical bore 45 which communicates with the bore 44. At the upper end of said barrel the same is constructed with a cylindrical bore 46 which communicates with the bore 45. All of these bores merge into one another so that a single continuous passageway 46 without irregularities is formed in the barrel which communicates with the passageway of the tube 22. Mounted within the passageway 46 of barrel 42 is a conical core 47 which has the same taper as the bore 45 and which is slightly smaller in diameter than said bore to form a restricted passageway within said bore, said passageway being part of the passageway 46 previously referred to. The conical member 46 is constructed with two cylindrical guides 48 and 49 which are adapted to slide along the cylindrical bores 44 and 46 respectively and which guide the core 47 for axial movement along the bore 45. The core 47 is reduced in diameter adjacent the guides 48 and 49 as indicated at 51 and 52 and is provided at such localities with transverse openings 53 and 54 which communicate with the constricted portion of the passageway 46. These transverse openings communicate with longitudinal passageways 55 and 56 which extend through the ends of the member 47. Passageway 55 is in communication with the passageway 46 at the lower end of the same and receives the beer discharged into said passageway from the tube 26. Passageway 56 in a similar manner directs the beer out of the flow regulating device as will be subsequently more fully described.

The core 47 is moved longitudinally within the passageway 46 to vary the cross section of the restricted portion of said passageway for the purpose of regulating the flow of the beer through the device. This is accomplished as follows: An elbow 57 is provided for this purpose which is constructed with a threaded neck 58 adapted to be connected to the barrel 42 by means of a threaded cap 59 engaging a collar 61 secured to said barrel. The elbow 57 is constructed with a cylindrical bore 62 concentric with the bore 46.

On the guide 61 of core 47 is mounted a cylindrical extension 63 which is formed upon the exterior thereof with rack teeth 64. This portion of the core 47 is movable along the bore 62. A pinion 65 having a handle 66 attached thereto is rotatable within a bearing 67 formed on the elbow 57. This pinion meshes with the rack teeth 64 and serves to raise and lower the core 67 when the handle 66 is rotated. By this means the quantity of beer flowing through the device may be manually regulated to meet the particular requirements.

Attached to the elbow 57 is a faucet 68. This faucet may be of any suitable construction, but is preferably of the type shown in my copending application for patent, Serial Number 70,364 filed March 23, 1936. This faucet is constructed with a body 69 attached to the elbow 57 and with a spout 71 discharging outwardly therefrom. An operating knob 72 opens and shuts the faucet. The faucet 68 is preferably of the on and off type and the control of the flow is procured by the flow regulating device 41.

Encircling the lowermost portion of the barrel 42 and the uppermost portion of the tap tube 22, is a jacket 73. This jacket consists of a tube or pipe which is greater in diameter than the barrel 42 or the tube 22. The jacket 73 is supported at its upper end by means of a collar 74 which is recessed as indicated at 75 to receive the upper end of the same. This collar fits snugly upon the exterior of the barrel 42 and is set into a recess 76 in the same. The lower end of the jacket 73 is attached to another collar 77 which encircles the tube 22. This collar is constructed with a recess 78 similar to the recess 75 in which the lowermost end of the jacket 73 is received. The various joints between the jacket 73 and the collars 74 and 77 in between said collars and the barrel 42 and tube 22 are soldered together to provide a water tight construction. By means of this construction a cooling chamber 79 is provided which encircles portions of the flow regulating device 41 and the tap tube 22. Within the cooling chamber 79 is disposed a small tube 81 which is received within a socket 82 in the collar 77. The upper end of this tube is open and disposed shortly below the collar 74 so that the cooling medium discharged from the upper end of said tube enters the chamber 79 at its upper end. A nipple 83 is screwed into a boss 84 formed on the collar 77 and communicates through a passageway 85 with the lower end of the tube 81. Another nipple 86 is screwed into a second boss 87 formed on the collar 77 and directly communicates through a passageway 88 with the lowermost portion of the chamber 79. A cooling medium is circulated through the chamber 79 by means of the nipples 83 and 86. The nipple 83 is connected to the source of the cooling medium which may be any cooling liquid of a refrigerating system or which may merely be cold water. The nipple 86 is connected to the return of such cooling system or in the case of cold water to a suitable drain. It will thus be seen that the cooling medium is discharged into the upper end of chamber 79 and travels downwardly along said chamber and along the barrel 42 of the flow regulating device 41 and the tap tube 22. As the cooling medium so travels the exposed portions of the tap tube and the flow regulating device are maintained at the proper temperature. By virtue of the short distance between the chamber 79 and faucet 68, said faucet is maintained at the proper temperature by conduction of heat through the metal of said faucet, the elbow 57 and the flow regulating device 41.

Attached to the collar 77 is a bracket 89 which extends beneath the spout 71 of the faucet 68. This bracket has secured to the outer end thereof a boss 91. A tray 92 is supported by the bracket 89 and has a shank 93 depending therefrom, which is received in a bore 94 in the boss 91. The tray 92 supports the glasses to be filled from the faucet 68 and is provided with a removable reticulate plate 95 on which the glasses rest. Any beer which is spilled over passes through the plate and is received in the bottom of the tray 92.

The use of the invention is as follows: When it becomes desirable to draw the beer from the barrel, my invention is applied thereto. The fixture 25 is first attached to bung 17. This is accomplished by inserting the tubular member 27 into the socket 21 and rotating the same until the lugs 34 and 35 become engaged. Nut 36 is next tightened until the fitting is firmly attached. Nipple 37 is thereafter connected to the source of compressed air or other gas for the purpose of maintaining pressure in the barrel. The tap tube 22 is next inserted into the device until the same passes gasket 32. Nut 33 is then sufficiently tightened to prevent leakage of beer past the same. The entire device including the tap tube 22 and the parts attached thereto are next forced downwardly. This causes the plug 23 to engage the cork placed by the brewer in the bung 17 of the barrel and forces the same into the barrel. The tube 22 is forced downwardly until the said plug hits the bottom 16 of the barrel. Nut 33 is then firmly tightened. The two nipples 83 and 86 are next connected to suitable conduits leading from the cooling medium and the device is then ready to operate. In drawing the beer, handle 66 is preferably moved to its lowermost portion as shown in Fig. 2, which closes the restricted passageway preventing the flow of beer. Faucet 68 is then fully opened. The flow through the regulating device 41 is then adjusted by manipulation of handle 66 until the desired rate of flow is procured. Thereafter beer may be dispensed from the device by merely opening and closing the faucet 68. Due to the application of the cooling system to the protruding portion of the tap tube 22 and to the major portion of the flow regulating device 41, heating up of the beer within the system after the beer leaves the barrel is entirely prevented.

With my invention, beer can be dispensed directly from the barrel without the necessity of the usual cooling box or the complicated refrigeration systems now in use. With my invention the parts through which the beer travels are readily accessible and may be removed for the purpose of cleaning. Due to the extremely short distance of travel of the beer from the barrel to the faucet, certain of the objections encountered with other systems of dispensing beer are entirely eliminated. My invention can be constructed at an economical cost and does not require installation as is necessary with other types of systems. My invention is extremely neat and attractive in appearance and is convenient to use.

Changes in the specific form of my invention, as herein disclosed, may be made within the scope of what is claimed without departing from the spirit of my invention.

Having described my invention, what I claim as new and desire to protect by Letters Patent is:

1. In combination with the tap tube of a beer dispensing device, a flow regulating device secured to the upper end of said tap tube and in alignment therewith, a faucet secured to the upper end of the flow regulating device, a collar on said tap tube intermediate the ends thereof, a cylindrical jacket secured at its lower end to said collar, means on said flow regulating device for engagement with the other end of the jacket, said jacket forming a cooling chamber extending about a portion of said tap tube and flow regulating device, a tube within said jacket supported at its lower end by said collar and communicating at its upper end with the upper end of said cooling chamber, means in said collar for directing a cooling medium to the lowermost end of said tube and means in said collar for leading the cooling medium from the lowermost portion of said chamber.

2. In combination with the tap tube of a beer dispensing device, a faucet communicating therewtih, a cylindrical jacket enclosing a part of said tap tube and forming a cooling chamber about the same, a collar encircling said tap tube, said cylindrical jacket being secured at one end to said collar, one end of said cooling chamber being closed by said collar, means for closing the other end of said cooling chamber, a tube within said jacket supported at its lower end by said collar for communication at its upper end with the upper end of said cooling chamber, means in said collar for directing a cooling medium to the lowermost end of said tube, and means in said collar for leading the cooling medium from the lowermost portion of said chamber.

3. In combination with the tap tube of a beer dispensing device, a flow regulating device secured to the upper end of said tap tube and in alignment therewith, a faucet secured to the upper end of the flow regulating device, a collar on said tap tube intermediate the ends thereof, a cylindrical jacket secured at one end to said collar, means on said flow regulating device for engagement with the other end of the jacket, said jacket forming a cooling chamber extending about a portion of said tap tube and flow regulating device, a bracket extending outwardly from said collar, a tray carried by said bracket, and means supported by said collar for leading a cooling medium into and out of said cooling chamber.

4. In combination with the tap tube of a beer dispensing device, a flow regulating device secured to the upper end of said tap tube and in alignment therewith, a faucet secured to the upper end of the flow regulating device, a collar on said tap tube intermediate the ends thereof, a cylindrical jacket secured at one end to said collar, means on said flow regulating device for engagement with the other end of the jacket, said jacket forming a cooling chamber extending about a portion of said tap tube and flow regulating device, a bracket extending outwardly from said collar, a tray carried by said bracket, a tube within said jacket supported at its lower end by said collar and communicating at its upper end with the upper end of said cooling chamber, means in said collar for directing a cooling medium to the lowermost end of said tube, and means in said collar for leading the cooling medium from the lowermost portion of said chamber.

5. In combination, a removable tap tube adapted to be inserted into a beer barrel and having a portion extending outwardly beyond the beer barrel, a flow regulating device secured to the outer end of said tap tube and connected therewith, a faucet secured to the outer end of the flow regulating device, a jacket enclosing a part of said outwardly extending portion of said tap tube and forming a cooling chamber about the same, said flow regulating device, faucet and jacket being solely supported by said draft tube, means for directing a cooling liquid into one end of said cooling chamber, and means for leading the cooling liquid away from the other end of said chamber.

6. In combination, a removable tap tube adapted to be inserted into a beer barrel and having a portion extending outwardly beyond the beer barrel, a collar secured to the outwardly extending portion of said tap tube, a jacket attached at one end to said collar and enclosing a part of said outwardly extending portion of said tube and forming in conjunction therewith a cooling chamber encircling said tap tube, means for leading a cooling liquid into and out of said chamber, a bracket secured to said collar, a tray carried by said bracket and a faucet supported by said tap tube and communicating therewith, said faucet discharging over said tray.

RICHARD T. CORNELIUS.